US012722948B2

(12) United States Patent
de Jong et al.

(10) Patent No.: US 12,722,948 B2
(45) Date of Patent: Sep. 1, 2026

(54) LIFTING SYSTEM WITH INDOOR POSITIONING SYSTEM AND METHOD THEREFOR

(71) Applicant: Stertil B.V., Kootstertille (NL)

(72) Inventors: Jurjen Jan de Jong, Kootstertille (NL); Rudolf Jacobus Antonius van Houten, Twijzelerheide (NL)

(73) Assignee: Stertil B.V., Kootstertille (NL)

( * ) Notice: Subject to any disclaimer, the term of this patent is extended or adjusted under 35 U.S.C. 154(b) by 215 days.

(21) Appl. No.: 18/099,733

(22) Filed: Jan. 20, 2023

(65) Prior Publication Data

US 2023/0150805 A1 May 18, 2023

Related U.S. Application Data

(63) Continuation-in-part of application No. 15/278,444, filed on Sep. 28, 2016, now Pat. No. 11,560,297.

(30) Foreign Application Priority Data

Sep. 30, 2015 (NL) ...................................... 2015532

(51) Int. Cl.
*B66F 3/46* (2006.01)
*B66F 13/00* (2006.01)
*B66F 17/00* (2006.01)

(52) U.S. Cl.
CPC ................ *B66F 3/46* (2013.01); *B66F 13/00* (2013.01); *B66F 17/00* (2013.01)

(58) Field of Classification Search
CPC ............. B66F 3/45; B66F 13/00; B66F 17/00
See application file for complete search history.

(56) References Cited

U.S. PATENT DOCUMENTS 6,634,461 B1 10/2003 Baker
8,523,146 B2 9/2013 Polins et al.
2006/0182563 A1 8/2006 De Jong et al.
2008/0277204 A1 11/2008 Moller et al.
2009/0087290 A1 4/2009 Wastel
2009/0236183 A1 9/2009 Bordwell et al.
2011/0037041 A1 2/2011 DeJong et al.
2012/0218564 A1 8/2012 Wustefeld et al.
2013/0240300 A1 9/2013 Fagan et al.
(Continued)

FOREIGN PATENT DOCUMENTS

WO 2009099322 A1 8/2009
WO 2015005771 A1 1/2015
(Continued)

*Primary Examiner* — Nirvana Deonauth
(74) *Attorney, Agent, or Firm* — The Webb Law Firm

(57) ABSTRACT

The present invention relates to a lifting system and method for lifting a vehicle. The lifting system has one or more lifting devices and includes a frame with a carrier configured for carrying the vehicle; a drive for driving the carrier in at least one of the ascent or descent of the carrier; and a controller with an indoor positioning system. The controller determines the location and the height of the carrier in at least one of the ascent or descent of the carrier of the one or more lifting devices. The controller has a remote control, and the controller further has a monitoring system configured for monitoring a safety zone. The monitoring system monitors a three-dimensional zone and the safety zone has an inner zone, an intermediate zone and an outer zone.

22 Claims, 9 Drawing Sheets

(56) References Cited

U.S. PATENT DOCUMENTS

| | | | |
|---|---|---|---|
| 2013/0299440 | A1 | 11/2013 | Hermann et al. |
| 2015/0232310 | A1 | 8/2015 | Jaipaul |
| 2016/0185580 | A1 | 6/2016 | Luinge |

FOREIGN PATENT DOCUMENTS

| | | | |
|---|---|---|---|
| WO | 2015005772 | A1 | 1/2015 |
| WO | 2015106307 | A1 | 7/2015 |

LIFTING SYSTEM WITH INDOOR POSITIONING SYSTEM AND METHOD THEREFOR

CROSS-REFERENCE TO RELATED APPLICATIONS

This application is a continuation-in-part of U.S. application Ser. No. 15/278,444 filed Sep. 28, 2016, which claims priority to Netherlands Patent Application No. 2015532 filed Sep. 30, 2015. The disclosure of each of these documents is hereby incorporated in its entirely by reference.

BACKGROUND OF THE INVENTION

Field of the Invention

The invention relates to a lifting system, more specifically a vehicle lifting system. In general, lifting systems are specifically used for lifting passenger cars, trucks, busses, or other vehicles and may involve a system comprising one or more moveable lifts or lifting devices, such as (mobile) lifting columns, lifting columns of the two-post lift type with pivoting support arms, the four-post lift type with runways, the mobile type, in-ground lifts etc.

Description of the Related Art

Conventional lifting systems comprise a frame with a carrier that is connected to a drive for moving the carrier upwards and downwards. In the ascent mode, hydraulic oil is pumped to a cylinder for lifting the carrier and, therefore, the vehicle. In the descent mode, the carrier with the vehicle is lowered and hydraulic oil returns to the reservoir. Such prior art lifting system is disclosed in U.S. Patent Application Publication No. 2006/0182563, which is incorporated herein by reference. Such lifting systems as well as other lifting systems require the use of a number of sensors, such as height sensors, to enable correct operation of the lifting system. This involves integration of these sensors and related components into the control system.

An object of the invention is to reduce complexity of vehicle lifting systems and/or to improve safety when working with these vehicle lifting systems.

SUMMARY OF THE INVENTION

This object is achieved with a lifting system for lifting a vehicle according to the invention, the lifting system comprising: one or more lifting devices, each comprising: a frame with a carrier configured for carrying the vehicle; a drive for driving each carrier of the one or more lifting devices in at least one of the ascent or descent of the carrier; and a controller comprising an indoor positioning system such that the controller determines the location and the height of the carrier in at least one of the ascent or descent of the carrier of the one or more lifting devices, and wherein the controller comprises a remote control, wherein the controller further comprising a monitoring system configured for monitoring a safety zone, wherein the monitoring system monitors a three-dimensional zone, and wherein the safety zone comprises an inner zone, an intermediate zone and an outer zone.

The lifting system according to the invention specifically relates to a vehicle lifting system using a number of lifting devices, including lifting columns, mobile lifting columns, lifting columns of the two-post lift type with pivoting support arms, the four-posts lift type with runways, in-ground lifts, for example. In the context of the present invention the carrier relates to the moving parts of the lifting device when lifting the vehicle. This carrier is driven by a drive, such as a hydraulic drive, pneumatic drive and/or electric drive.

The lifting system according to the present invention comprises a controller with an indoor positioning system. The controller is provided to control the vehicle lifting with the lifting device of the present invention, optionally with the lifting device being included in a group of lifting devices that jointly lift the vehicle, for example in case of mobile lifting columns. Such controller can be operated by a user, also referred to as operator, at the desired location. Such controller may further relate to a so-called central controller that is capable of controlling several lifting devices. The controller preferably is or comprises a remote control that may relate to a dedicated remote control or an existing apparatus such as a tablet or mobile phone that is provided with the relevant software. Preferably, such (central) controller comprises a wireless transmitter and receiver to enable a wireless control of the lifting device by a user. This further enhances the flexibility for a user when lifting a vehicle. Optionally, the remote is switched off when not being used for a pre-determined time period, for example 2 minutes or any other suitable time period. Also optionally, the transmission power of the remote control can be designed or controlled to limit the distance of operation between the remote control and the lifting device. This prevents accidental instructing the lifting device to move and, thereby, improves the overall safety of working with the lifting device.

According to the invention the controller of the lifting device comprises a wireless communication coupling. This wireless communication coupling is configured for coupling the lifting device to a further lifting device to enable jointly lifting the vehicle. The one or more lifting devices may relate to different types of lifting devices, such as lifting columns, mobile lifting columns, lifting columns of the two-post lift type with pivoting support arms, the four-posts lift type with runways, in-ground lifts. Providing the wireless communication coupling enables a joint control of the first and further lifting device when lifting a vehicle, for example. This can be used in different situations, including lifting trains or road trains, or articulated/accordion buses with two or more four-post lifts or sky lifts or other lifting devices, for example. By providing the wireless communication coupling it is no longer required to connect the lifting devices with a communication cable. This further improves the overall flexibility when working with the lifting device and lifting system according to the present invention. In addition, the wireless communication coupling obviates the safety hazard of cables across the workshop floor. In a presently preferred embodiment the remote control uses a RS485 port with a transmitter/receiver. Furthermore, in a presently preferred embodiment the remote control is capable of controlling one of the lifting devices alone or jointly with the other lifting devices. This provides a flexible and effective control of a lifting operation. It will be understood that other communication possibilities can also be envisaged in according to the present invention.

The lifting device according to the present invention further comprises an activator that is configured for searching and/or coupling the controller to the lifting device. This activator is used to find and/or couple the controller to the lifting device. This activator comprises a RFID-system for the searching and/or coupling of the controller to the lifting device. Such radio-frequency identification (RFID) system makes use of electromagnetic signals and comprises a RFID-reader that is preferably capable of triggering with a pulse on a RFID-tag. Such tag transmits relevant data back to the RFID-reader such as an identification number. Such RFID-tag typically comprises a chip for processing information and an antenna for receiving and/or transmitting data that are preferably provided on a substrate. These RFID-tags can be passive or active involving a battery. In the presently preferred embodiments of the invention an active RFID-tag is used to improve data transmission. The RFID-reader waits for receipt of a signal from a RFID-tag or may (periodically) transmit a signal when switching an RFID-tag. The RFID-system preferably operates in the frequency band between 120 kHz and 10 GHz, although it is presently preferred to use the ultra-high frequency (UHF) bands. In the context of the present invention it is noted that in certain embodiments of the invention the RFID-system may also operate on a Terahertz frequency to which is also referred as a TFID-system.

The RFID-system enables a user to position the RFID-reader and RFID-tag at a certain distance as the tag can be read at a distance from the reader. This improves flexibility for a user when using the lifting device of the present invention as no physical contact between the tag and the reader is required. Furthermore, there is no specific need to present the tag to the lifting device and/or enter access or validation codes or passwords.

The RFID-system is particularly useful for searching and/or coupling with a lifting device, optionally with two or more different lifting devices, and provide an automatic identification. Optionally, a user must provide an individual identification to the RFID-system and/or control of the lifting device to enable its use. Thereafter, the RFID-system enables coupling to one or more lifting devices. It is noted that in operation the lifting device can make use of wireless communication that optionally uses Wi-Fi, Bluetooth, Zigbee or other suitable communication protocol.

In a presently preferred embodiment the operation from a controller on the lifting device itself is blocked after coupling the controller. This reduces the risk of safety conflicts. Preferably, the (local) controller on the lifting device itself is unlocked after signing out or logging off the (remote) control. Optionally, when controlling the lifting device with a remote control a signal is generated for actually moving the lifting device. Such signal may involve a sound and/or light signal.

Preferably, the RFID-system is capable of coupling with different types of lifting devices. This provides the advantage of using the RFID-system and the (central) controller in cooperation with different types of lifting devices such as mobile lifting column, in-ground lifts, or other suitable lifting devices. This further enables a user to rely on a single (remote) control for operation of several lifting devices. Furthermore, the (remote) control can be directly linked to a specific user. This further increases the flexibility when lifting a vehicle.

In a preferred embodiment of the invention the remote control comprises a wireless charger.

Providing the remote control with a wireless charger enables wirelessly charging the battery of the remote control, thereby guaranteeing the operation of the remote control and (parts of) the RFID-system.

As a further advantage this renders it possible to optionally provide a gastight remote control in a presently preferred embodiment of the invention. Providing such an optional gastight remote control improves the overall safety when working with the lifting device. In particular, such remote control provides additional safety in the presence of fuel gases and/or exhaust/compression gases. In addition to the safety improvement this also improves the operational flexibility.

In a presently preferred embodiment of the present invention the lifting device is provided with a RFID-reader and the (remote) control is provided with an RFID-tag. It will be understood that in an alternative embodiment the (remote) control is provided with the RFID-reader and the lifting device provided with an RFID-tag.

In a presently preferred embodiment of the invention the (remote) control can be deactivated with a de-activator.

By providing a de-activator the controller is deactivated for use with a specific lifting device. For example, the (remote) control can be deactivated in case of an unsafe situation. This increases the overall safety when lifting a vehicle.

The de-activator may apply an inactive time period, such that after this specific time period, wherein the controller is inactive, also referred to as a time-out, the (remote) control is deactivated. For a further operation with this controlling a new coupling and/or unlocking is required. This improves safety when working with the lifting device of the present invention. An inactive time period can be a period of 1 to 2 minutes, for example. It will be understood that other time intervals can also be envisaged in accordance with the present invention.

In addition, or as an alternative, the activator may also comprise an inactive distance. In such embodiment, when the control is positioned at a distance from the lifting device larger than the inactive distance, the de-activator stops the coupling of the controller with the lifting device. For further operation a new coupling and/or unlocking is required. An inactive distance can be 3 meters, 5 meters, 10 meters or any other suitable distance.

In a presently preferred embodiment the RFID-system is used to determine the actual distance between the controller and the lifting device. This provides an effective means to compare the actual distance with the inactive distance and to determine the operation of the controller in association with the lifting device.

As an alternative or in addition to the actual distance measurement with the RFID-system the transmitting power of the controller can be adjusted to send a maximum operational distance of 5 m to 10 m, for example. This guarantees that a user accidentally operates the lifting device when being on a different location and/or at a large distance from the lifting device.

Preferably, the de-activator is adjustable. For example, an adjustment is possible of the inactive time period and/or the inactive distance and/or the frequency of a check by the de-activator. This enables adjustment of the de-activator and the lifting device in view of the specific circumstances, such as the presence of other lifting devices in the near vicinity of the controlled lifting device.

In a presently preferred embodiment of the invention the controller comprises a signaling device.

By providing a signaling device the (immediate) vicinity of the lifting device can be given a warning signal when the controller starts operation and/or starts an actual lifting or lowering of a vehicle. This improves safety when working with the lifting device. The signaling device may provide an acoustic and/or other suitable signal. For example, the signal may be an indicative signal of 1 to 2 seconds indicating movement of the carrier. Alternatively, or in addition thereto, a signal can be generated from the lifting device itself, optionally involving a light signal. Preferably, no acoustic or other signal is generated within a time interval after the last signal. This enables continuous operation of the lifting device. Such time interval is 10 seconds, for example.

In a presently preferred embodiment of the invention the (remote) controller transmits its data to the lifting device. In case multiple lifting devices such as mobile lifting columns are coupled in a set or lifting system the remote control preferably transmits its data to a specific column, to which can also be referred to as master column that uses the data. The receiving lifting device uses the data to control the lifting operation. For safety reasons the lifting device communicates periodically with the remote control to continue this specific configuration of the lifting device with remote control. This time period is one signal per second, for example. In case multiple lifting devices are coupled together, the receiving lifting device that is coupled to the (remote) control preferably transmits the data to the other devices. This is specifically relevant for mobile lifting columns and in-ground lifting devices. In such cases a selection of lifting devices is optionally performed with one of these lifting devices and/or with the use of the remote control.

As an optional feature, the indoor positioning system is capable of communicating with one or more transponders, also referred to as transmitter and responder. Such transponders are also optional. The transponder transmits a message in response to a received message. The indoor positioning system is capable of locating the lifting device, and more specifically the carrier of the lifting device, inside a building, using radio waves, magnetic fields, acoustic signals or other means of transferring information. Possibly, a combination of signals can be applied. With the use of optical, radio or acoustic technologies, or other convenient technologies, the position and height of the carrier can be determined. Preferably, at least three independent measurements are used by the control system to determine the location and height of the carrier involving the use of trilateration.

The transponders may relate to so-called active transponders that are provided with an energy supply such as a battery or power supply. Also, transponders may relate to so-called passive transponders that receive the required energy from the received signal. An indoor positioning system using Wi-Fi signals is also referred to as a Wi-Fi-based positioning system. Also, blue tooth and other signals can be used in addition or as an alternative. Alternatively, or in combination with the aforementioned active and/or passive transponders, other devices acting as transponder can be applied. In the context of the present invention a transponder is a device that is capable of generating or forwarding a signal indicative for its location (and height), preferably in response to an interrogating (received) signal.

By providing the transponder on or at the carrier, both location and height of the carrier can be determined with the indoor positioning system of the controller. This obviates the need for separate height sensors, as the transponder can be used for both location determination and for height measurement of the carrier during the lifting operation. This renders the lifting system less complex. Location of lifting devices is used when selecting lifting devices for a lifting system. This specifically relates to mobile lifting column, for example. The height measurement is relevant for all types of lifting devices.

As an example, in an embodiment of a lifting system according to the invention, at least two lifting columns are being used as lifting devices. In fact, often four lifting columns are being used. When lifting a vehicle, controlling the actual height of the carriers of these separate lifting columns and optionally also the moving speed of the carrier that carries (part of) the vehicle when lifting a vehicle requires synchronization. The controller preferably synchronizes the height of the separate carriers in the ascent mode using, for example, a measurement signal generated by the indoor positioning system. In case one of the carriers has moved too fast in the ascent mode and is too high as compared to the other carriers of the other lifting columns the power supply to this carrier is either directly or indirectly lowered so that the other carriers can catch up or, alternatively, the power supply to the other carriers is either directly or indirectly increased so that the other carriers can catch up. In the descent mode, it is also important that the height of the carriers between the several lifting columns is synchronized. Therefore, in case one of these carriers has moved too slowly, its power supply is increased in order for this carrier to catch up with the other carriers or, alternatively, the power supply to the other carriers is either directly or indirectly lowered so that the other carriers can catch up.

Other types of lifting devices involve a similar (synchronization) operation and may also benefit from the use of the indoor positioning system.

Preferably, the controller further comprises an orientation detector. With the orientation detector, the orientation of the lifting device can be established with the indoor positioning system. For example, the orientation of a lifting device is relevant when using mobile lifting columns that can be repositioned in a building relative to the vehicle to be lifted. In one of the embodiments according to the present invention, the orientation detector is a further transponder. Alternatively or in addition thereto, the orientation detector comprises an electronic compass or so-called magnetometer. An example of such magnetometer is known from consumer devices such as mobile phones and tablet computers.

In a presently preferred embodiment according to the present invention the controller further comprises a monitoring system configured for monitoring a safety zone.

By providing a monitoring system, the lifting system can be protected with a safety zone. This safety zone defines an area or zone that is monitored using one or more sensors, optionally including transponders. When a person and/or object enters the safety zone and/or is present in the safety zone, movement of the carrier is optionally blocked by the controller. This increases safety when working with the system according to the present invention. This safety zone preferably is a three-dimensional zone that can be shaped as a wall, circle, sphere, dome, or any other appropriate shape. The safety zone can be shaped with one or more boundaries. For example, in one embodiment the safety zone comprises an inner working zone and an outer non-working zone. In another embodiment the safety zone comprising an inner non-working zone, for example directly under the lifting device, an intermediate working zone, and an outer non-working zone. It will be understood that other examples of the shape and size of the safety zone can be envisaged.

In a further preferred embodiment according to the present invention the monitoring system comprises an adaptation system that is configured for adjusting the boundaries of the safety zone.

Preferably, the monitoring system comprises an adaptation system configured for adjusting the boundaries of the safety zone. In a presently preferred embodiment, the adaptation system responds to a height measurement of the carrier. The adaptation system may adjust the boundaries of the safety zone, rendering the safety zone dynamic in size and/or shape. Other parameters may also be used by adaptation system, such as the presence and/or type of vehicle that is lifted and the distance to other systems and other sets of lifting devices. Therefore, the lifting system may comprise a vehicle detector that is capable of detecting the presence of a vehicle and preferably the vehicle type.

As an example, the adaptation system enables adjustment in response to the actual height of the carrier and/or the presence of a vehicle in the lifting system of the present invention. The safety zone may have a (dynamic) working/operational zone wherein an operator may perform operations with the lifting system. For example, in some cases, in a zone directly under and/or around the lifting system operating the lifting system with a remote control is prohibited. For example, in an in-ground lift the remote control is enabled to operate under the vehicle when the carrier is below a height of about 30 cm. This enables positioning the carriers, for example. This (safety) zone is (dynamically) established in response to a height measurement to prevent a person from getting under the vehicle when moving the carrier, for example. In a further example, the outer boundary of the safety zone defines the maximum distance from the lifting system an operator may use the lifting system. In one of the embodiments, this results in a dynamic safety zone with an inner boundary and an outer boundary. This safety zone can be shaped as a wall, block, three-dimensional shape, dome shape, and other appropriate shapes.

In a further preferred embodiment according to the present invention, the monitoring system further comprises a warning system configured for providing a warning signal and/or control signal in response to a person and/or object provided with a transponder entering and/or being in the safety zone.

By providing a warning system, appropriate warning and/or control signals can be generated. A warning signal can be provided to an operator, for example with a mobile device such as a phone or tablet computer. Also, a warning can be provided to a supervisor or other person or system. Alternatively or in addition thereto, a control signal can be provided to the controller and optionally the lifting system can be blocked until the person and/or object has been removed from the safety zone, for example.

In a further preferred embodiment according to the present invention the monitoring system further comprises an engagement safety system configured for monitoring correct engagement of the carrier to the vehicle when lifting the vehicle.

By providing an engagement safety system a correct engagement of the carrier to the vehicle, for example to the wheel axles, wheels or other engagement area of the vehicle can be monitored. In case of an incorrect engagement, the lifting system can be blocked by the controller. The engagement safety system may use a camera or other sensing device for monitoring the engagement. The transponder can be used by the controller to establish that the carrier is indeed blocked in case of a warning. This increases the overall safety of the lifting system according to the present invention.

Preferably, the monitoring system further also comprises a descent safety system configured for monitoring a safe descent of the carrier. This is for example advantageously applied to an in-ground lifting system of a fully flush-mounted type. The correct location can be determined by the controller using the transponder on the carrier of the indoor positioning system, for example. For example, such flush-mounted type in-ground lift is described in U.S. Pat. No. 8,523,146, which is incorporated herein by reference. Also, in a presently preferred embodiment of the present invention it is possible that the controller of the lifting system uses the transponders to position the carrier correctly in a descent mode. Correctly positioning the lifting device is optionally done automatically by the controller.

In a further preferred embodiment according to the present invention, the lifting system further comprises a release system for releasing the carrier and enabling the lifting system to lift the vehicle.

By providing a release system, the lifting system can be enabled to lift a vehicle. Preferably, the release system is controlled in cooperation with the monitoring system. Optionally, the release system is controlled by the controller in response to payment instructions, identification and/or authorization procedures. The release system may involve locking and/or unlocking means. This prevents undesired and/or unneeded lifts. In addition, this also enables direct debiting of the vehicle owner for the usage of the lifting system, providing a type of so-called pay-per-lift debiting system. Optionally, the release system receives a clearance signal of a clearance system after payment, identification and/or authorization to perform a number of lifting operations, optionally in a specific time period.

In a further preferred embodiment according to the present invention, the controller further comprises a remote control.

By providing a remote control, the operation of the lifting system is rendered more easy and effective for an operator. The remote control may relate to a mobile phone, tablet computer or other device. Preferably, the indoor positioning system also senses the location of the remote control and uses the information in the monitoring system, for example. This can be achieved by providing the remote control with a transponder of the indoor positioning system, for example.

In a further preferred embodiment according to the present invention, the lifting system comprises two or more sets of lifting devices, wherein each set is configured for lifting a vehicle, the lifting system further comprising a central controller.

By providing a central controller, the controller is capable of controlling multiple lifting systems and/or multiple sets of lifting devises. As an example, when a vehicle needs to be lifted, a set of (mobile) lifting columns is selected and is defined as a group. The central controller controls this group of lifting devices. Another group of lifting devices can also be controlled by the central controller independently. Optionally, the central controller instructs the adjustment system of the monitoring system to amend or adjust boundaries of the safety zone, taking into account the location of the different groups of lifting columns. Furthermore, the central controller may communicate with remote computers or computer systems for maintenance and repair, logistics, debiting etc.

Optionally, the central controller selects a set of lifting devices that is available and most convenient for a user. Next, the user can be provided with a suggested set of lifting devices that he only needs to approve. This prevents the user to contact each individual lifting device that needs to be selected. Optionally, the selection is automatically authorized and the specific set of lifting devices is directly ready for use.

In a further preferred embodiment according to the present invention, the lifting system further comprises one or more tools and/or accessories that comprise a transponder.

By providing tools and/or accessories with a transponder, the indoor positioning system is capable of determining the location of these tools and/or accessories. This information can be used in the safety system, for example. Furthermore, this information can be used by the controller for monitoring location (and height) of tools, such us wheel dollies, axle stands, transmission jacks etc., relative to the vehicle. Optionally, the controller locks the lifting system until the required tools and/or accessories are available on the desired location, for example.

As a further example, in case the remote control with transponders is below 460 mm or 18 inch from the work floor, the remote control can be blocked by the controller and it is no longer active in the lifting system. This contributes to an explosion-proof lifting system.

BRIEF DESCRIPTION OF THE DRAWINGS

Further advantages, features and details of the invention will be elucidated on the basis of preferred embodiments thereof, wherein reference is made to the accompanying drawings, in which.

DETAILED DESCRIPTION OF THE INVENTION

The following description is merely exemplary in nature and is in no way intended to limit the invention, its application, or uses. While the disclosure is described as having exemplary attributes and applications, the present disclosure can be further modified. This application is therefore intended to cover any variations, uses, or adaptations of the disclosure using its general principles. Further, this application is intended to cover such departures from the present disclosure as come within known or customary practice of those skilled in the art to which this disclosure pertains and which fall within the limits of the appended claims. Accordingly, the following description of certain embodiments and examples should be considered merely exemplary and not in any way limiting.

Figure 1:
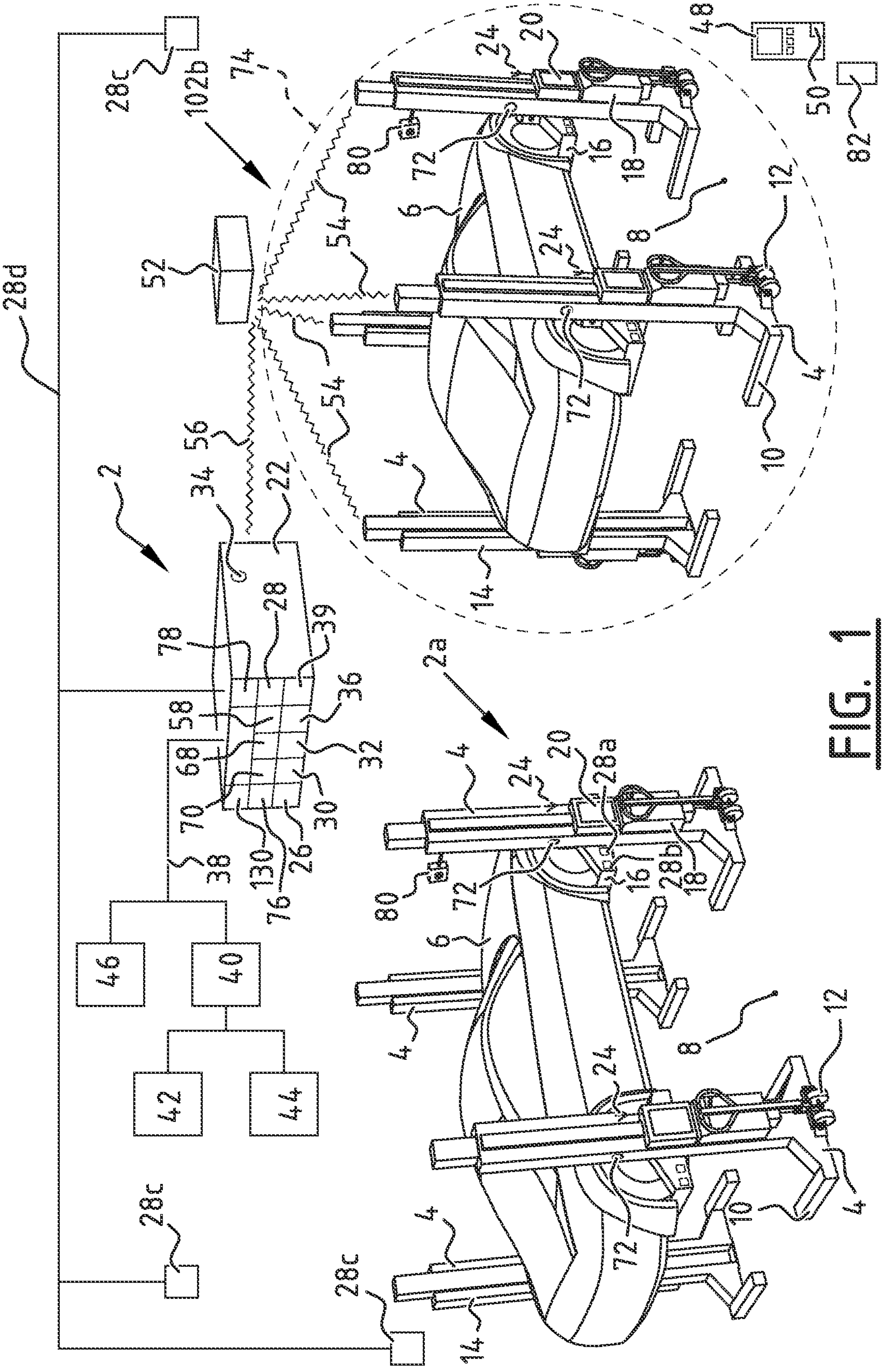
FIG. 1 shows a lifting system with multiple groups of lifting devices and a central controller according to the present invention.

In the illustrated embodiment lifting system 2 (FIG. 1) comprises two sets of mobile lifting columns 2*a*, 2*b*. In the illustrated embodiment each set comprises four mobile lifting columns 4. Lifting columns 4 lift passenger car 6 from ground 8. Lifting columns 4 comprise foot 10 which can travel on running wheels 12 over ground surface 8 of for instance a floor of a garage or workshop. In the forks of foot 10 there is provided an additional running wheel (not shown). Lifting column 4 furthermore comprises mast 14. Carrier 16 is moveable in upward and downward directions along mast 14. Carrier 16 is driven by a motor 18 that is located in a housing of lifting column 4. Motor 18 is supplied with power from the electrical grid, or by a battery that is provided on lifting column 4 in the same housing as motor 18, or alternatively on foot 10 (not shown). Display unit 20 may provide the user with information about the lifting system.

In the illustrated embodiment lifting columns 4 are connected to central controller 22 by wireless communication means 24 on individual lifting column 4 and wireless communication means 26 on central controller 22. Wireless communication means 24, 26 involve one or more transmitters and/or receivers.

The illustrated lifting system 2 includes at least two lifting columns 4. Each of the lifting columns has at least one ascent mode and one descent mode, and is under the influence of central controller 22. In the illustrated embodiment controller 22 is positioned centrally above lifting columns 4 assuring a good communication path between the individual lifting columns 4 and the central controller 22.

Central controller 22 determines the desired control actions. This may involve receiving a measurement signal representing the actual height of a carrier of an individual lifting column that is measured with indoor positioning system 28. In the illustrated embodiment, indoor positioning system 28 is incorporated in central controller 22. Indoor positioning system 28 is capable of measuring position and/or speed of carrier 16. In the illustrated embodiment indoor positioning system 28 comprises a transponder 28*a* and magnetometer 28*b* attached to carriers 16, and a number of "satellites" 28*c* positioned in the vicinity of lifting system 2 and communicating with wired or wireless communication lines 28*d* with central controller 22.

Central controller 22 detects height differences between lifting columns, calculates the required control actions with computing means 30, such as a processor, for individual lifting columns, and communicates the control actions to the relevant individual lifting columns. In the illustrated embodiment battery 32 provides power to central controller 22. Alternatively, or in addition, power is provided through connection 34 to the electrical grid. Data can be stored in memory/storage 36. Central controller 22 is provided with a wired and/or wireless connection 38 to enable connection between communication module 39 of central controller 22 to internal and/or external networks, involving internal company networks for workshop control 40, financial control 42 and maintenance 44, for example, and optionally to external networks 46 of suppliers and/or customers, for example.

Remote control 48 is provided with additional transponder 50 to enable monitoring the position of remote control 48. It will be understood that other tools and/or accessories can also be monitored by indoor positioning system 28.

In the illustrated embodiment there is provided wireless functionality to communicate in one or more environments such as LAN, WAN, VPN intranet, internet etc. that are schematically shown in the illustrated embodiments. Display unit 20 is further provided with input/output ports, such as USB, SD card reader, smart phone communication possibilities etc. to improve the functionality. Display 20 and/or remote control 48 may provide warning signals to the user.

Optionally, central controller 22 is provided with a number of communicators/distributors 52, such as an RF-host, that sends and/or receives signals 54 between lifting columns 4 and communicator 52, and signals 56 between communicator/distributor 52 and central controller 22. Communicators/distributors 52 provide additional robustness to the overall operation of the groups 2*a*, 2*b* of lifting columns 4.

Figure 2:
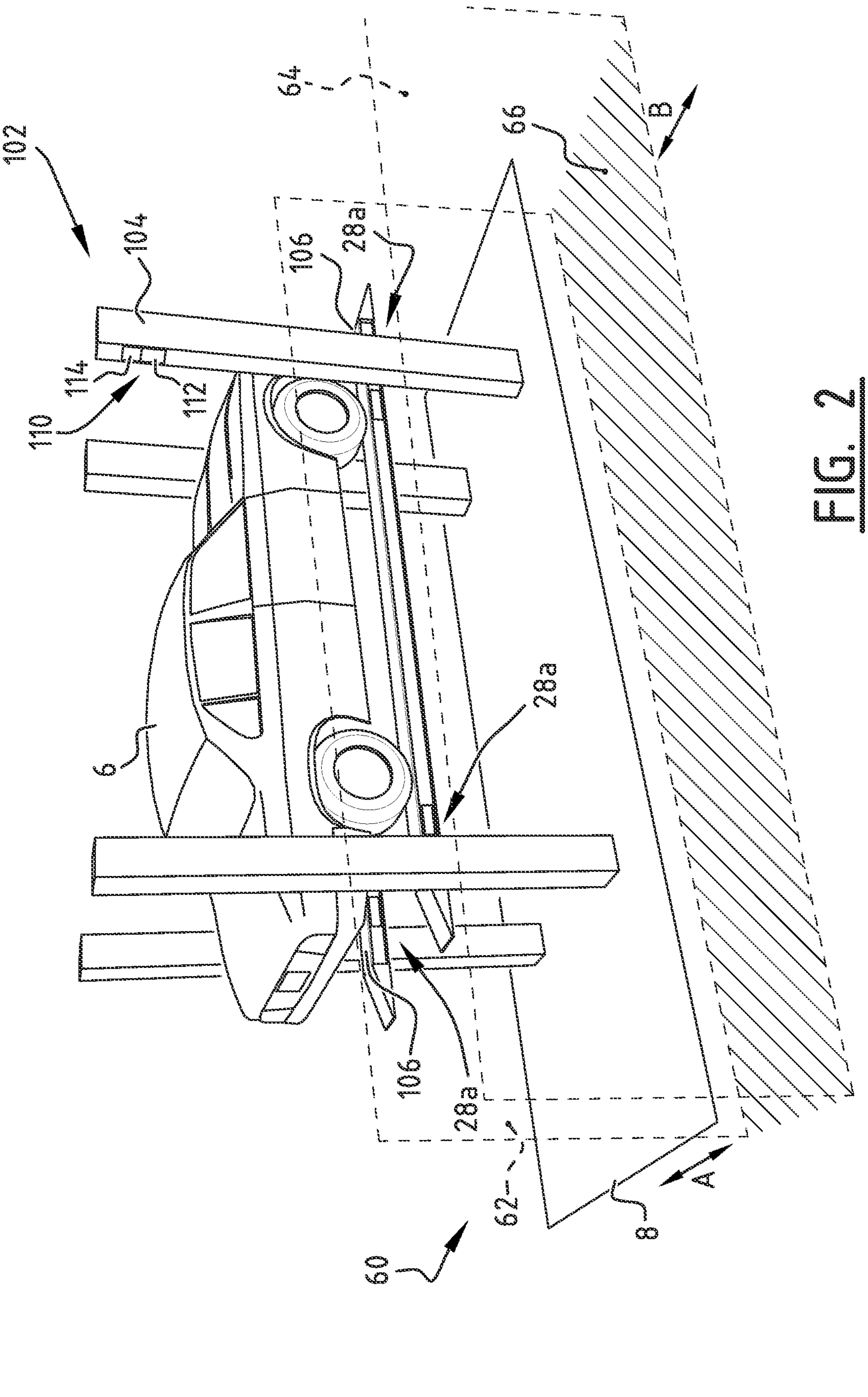
FIGS. 2-7 show alternative embodiments with different types of lifting devices according to the present invention.

In a preferred embodiment, central controller 22 is provided with monitoring system 58 that defines safety zone 60 (for illustrative purposes safety zone 60 is illustrated in FIG. 2). In the illustrated embodiment group, 2*a* is provided with an inner boundary surface or wall 62 and an outer boundary surface or wall 64. The space between walls 62, 64 is working zone 66 wherein an operator is allowed to operate group 2*a*. On the other side of surfaces or walls 62, 64, operation is locked or not authorized. Safety zone can be applied to the different types of lifting devices in the illustrated or another suitable shape.

Preferably, central controller 22 (FIG. 1) comprises adaptation system 68 that is capable of adjusting or adapting boundaries 62, 64 in directions A and B, respectively. Adaptation system 68 responds to indoor positioning system 28. Furthermore, central controller 22 preferably comprises warning system 70 capable of sending a warning to a user or operator in case of a safety issue. For example, in case control of group 2*a* is activated outside working zone 66 a warning message is provided to remote control 48 and/or any other suitable device. Optionally, release system 72 locks and/or unlocks lifting columns 4 thereby locking and/or unlocking movement of carrier 16.

It will be understood that other configurations/designs for safety zone 60 can be envisaged in accordance with the present invention. For example, for group 2*b* a dome-shaped safety zone 74 is illustrated. Optionally, a two-wall safety zone can be provided by monitoring system 58. Other shapes can also be provided, including circular, spherical, donut shapes etc. Optionally, the boundaries are adjustable.

In the illustrated embodiment central controller 22 further comprises engagement system 76 and descent safety system 78. Engagement system 76 may comprise camera 80 that monitors engagement of carrier 16 to vehicle 6. Camera 80 may also operate as vehicle detector. Alternatively, separate cameras 80 and/or other appropriate sensing means are provided. Descent safety system 78 monitors descent of carrier 16 in relation to its position with indoor positioning system 28. This enables lowering carrier 16 at a desired location.

In system 2, a user optionally performs a selection of lifting columns 4 that are incorporated in a group 2*a*, 2*b* by selecting lifting columns with a key or card 82 or other means. Optionally, controller 22 selects most suitable lifting columns 4 with indoor positioning system 28 and presents the selection to the user. Preferably, the selected group of lifting columns 4 in system 2 is provided with user instructions on one of the lifting columns 4, using display 20 and/or remote control 50, for example. Transmitter/receivers 24, 26 provide the instructions to central system controller 22. On a central level, controller 22 determines the individual control actions to be taken for all lifting columns 4 in system 2. Transmitter/receivers 24, 26 provide the control actions from the central controller to the individual lifting column 4. Information about the actual position of carrier 16 and/or other relevant data is measured by indoor positioning system 28 and the measurement data is provided to central controller 22 that determines if and what control actions are required. In the illustrated embodiment no direct communication between individual lifting columns 4 is required. This significantly contributes to the robustness of lifting system 2.

Operation and control of a single group of lifting columns with a dedicated group controller is also possible in a similar manner as described for the two groups 2*a*, 2*b*. Controller 22 is suitable for use with lifting systems comprising any number of lifting devices 4, including systems having one, two, four or another number of columns 4. The columns 4 may achieve lifting and lowering capability by any means known to those of skill in the art, including hydraulically, electrically, mechanically, and electromechanically. Lifting systems 2 that are compatible with the control system may be stationary and/or permanently affixed or attached to a certain location or may be mobile, capable of being transported via wheels or any other suitable means known to those in the art. With reference to the figures, like element numbers refer to the same element between drawings.

Next, examples will be given of the use of indoor positioning system 28 in combination with other types of lifting devices. It will be understood that also other embodiments according to the present invention can be envisaged.

For example, a four-post lifting system 102 (FIG. 2) comprises four columns 104 carrying runways 106. Preferably, each column 104 has one transponder 28*a* and compass 28*b*. In the illustrated embodiment an indicator 110 with a green light 112 and a red light 114 is provided. Light 110 signals to the driver when vehicle 6 is positioned correctly relative to columns 104 and the vehicle 6 can be lifted. In case each column 104 is connected to indoor positioning system 28 the position of the carrier/runways 106 can be checked. This contributes to the overall safety of the lifting operation.

Figure 3:
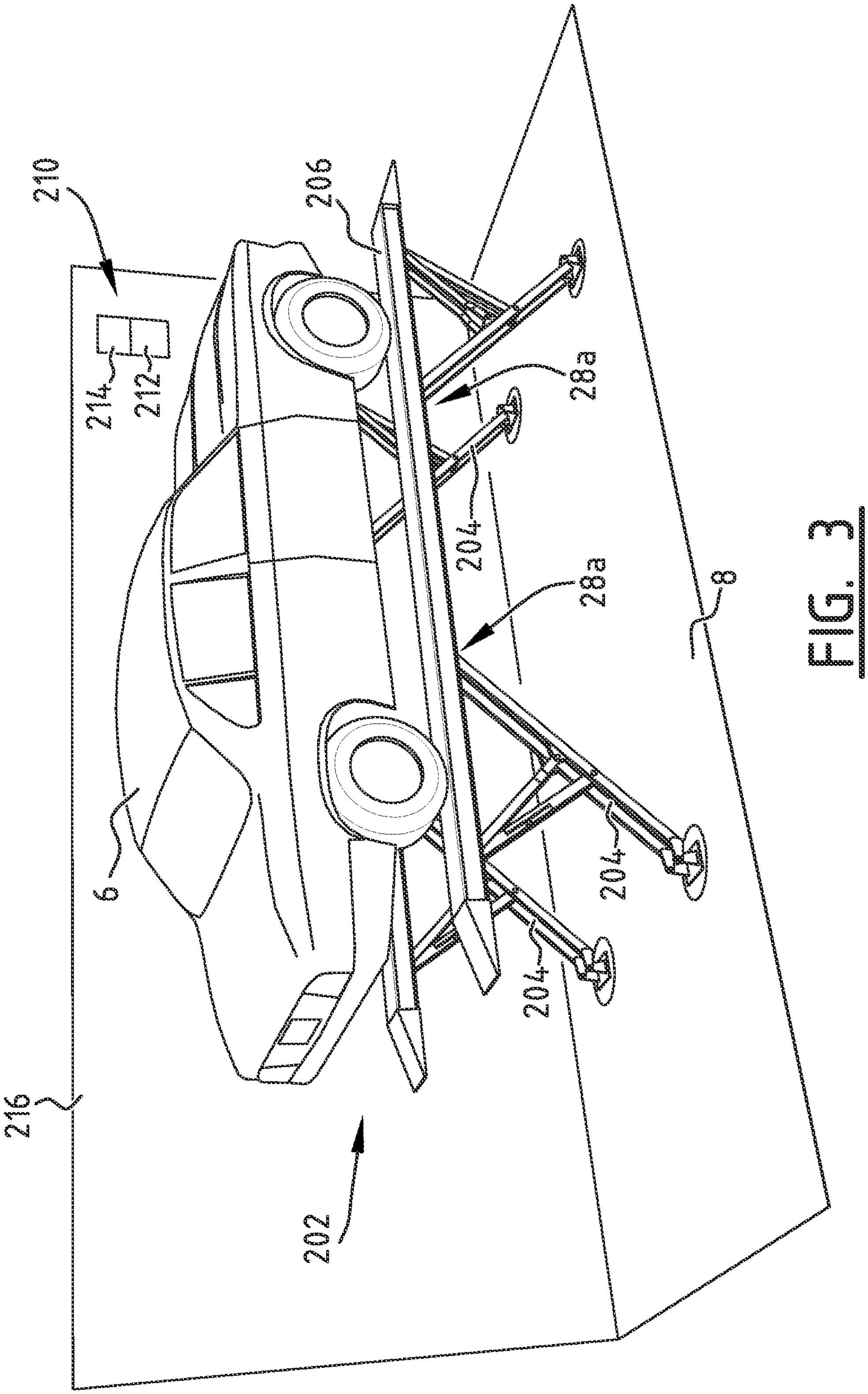

As a further example, lifting system 202 (FIG. 3) comprises a so-called sky-lift configuration with four posts 204 carrying runways 206. In the illustrated embodiment transponder 28*a* and compass 28*b* is provided for every post 204. This enables the check on positioning of the carrier as described earlier by calculating the height of runways 206 from the orientation of posts 204, for example. Optionally, transponder 28*a* is provided directly on or at runways 206. A light 210 with green 212 and red 214 lights can be provided on wall 216 to indicate to the driver of vehicle 6 that the vehicle is positioned correctly or needs to be repositioned.

Figure 4:
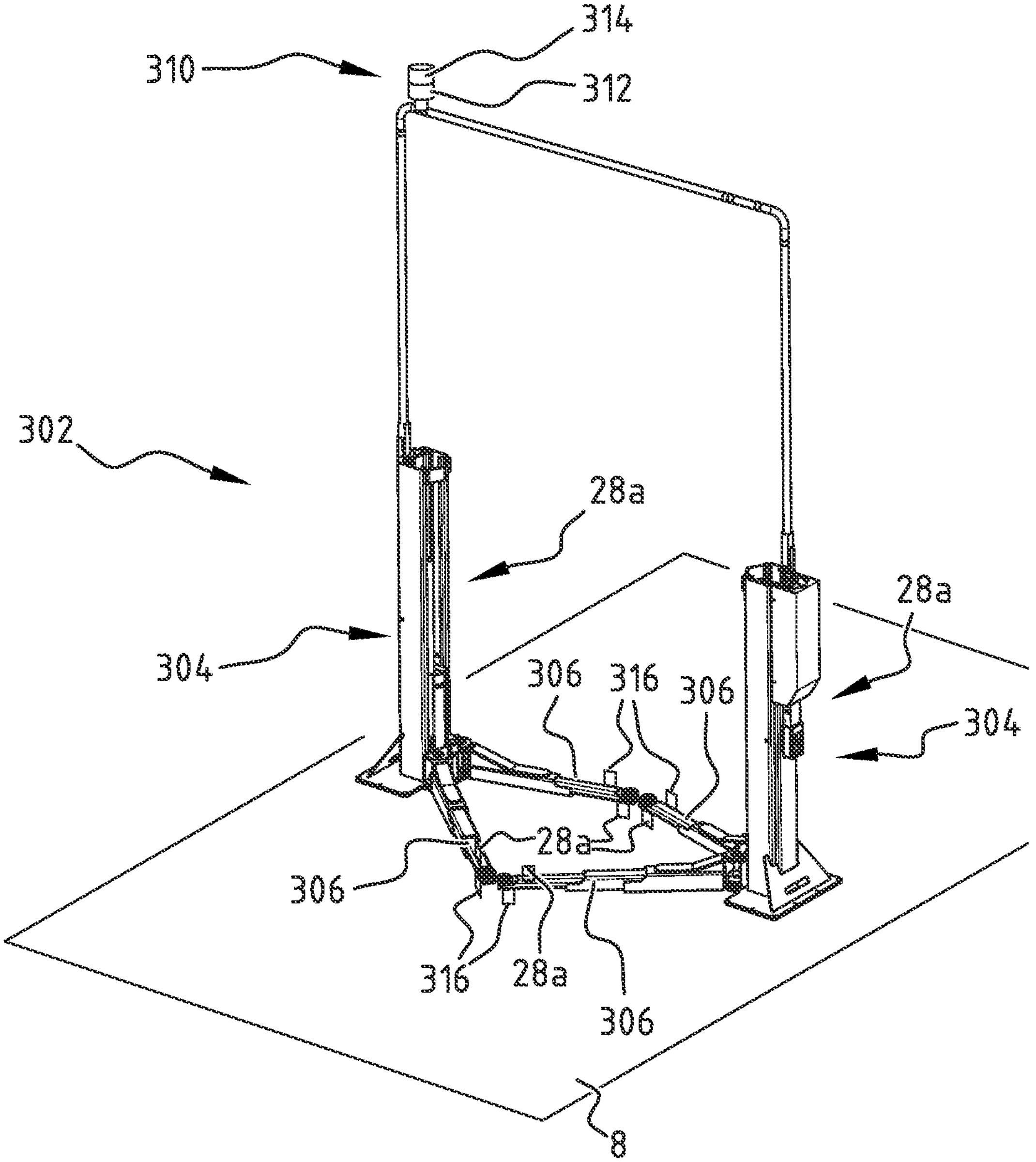

As an even further example, lifting system 302 (FIG. 4) comprises a so-called two-post configuration with two posts 304 that are provided with carrier arms 306. In the illustrated embodiment, to measure position and speed of carrier arms 306 transponder 28*a* is provided. This enables the check on positioning of arms 306 as described earlier. A light 310 with green 312 and red 314 lights can be provided to indicate to the driver of vehicle 6 that the vehicle is positioned correctly or needs to be repositioned.

Providing arms 306 with transponders 28*a* enables monitoring the position and level of extension of arms 306. This enables dynamic adjustment of the maximum load, as a long arm reduces maximum load and a short arm increases maximum load. Load can be measured with load cell 316.

Figure 5A:
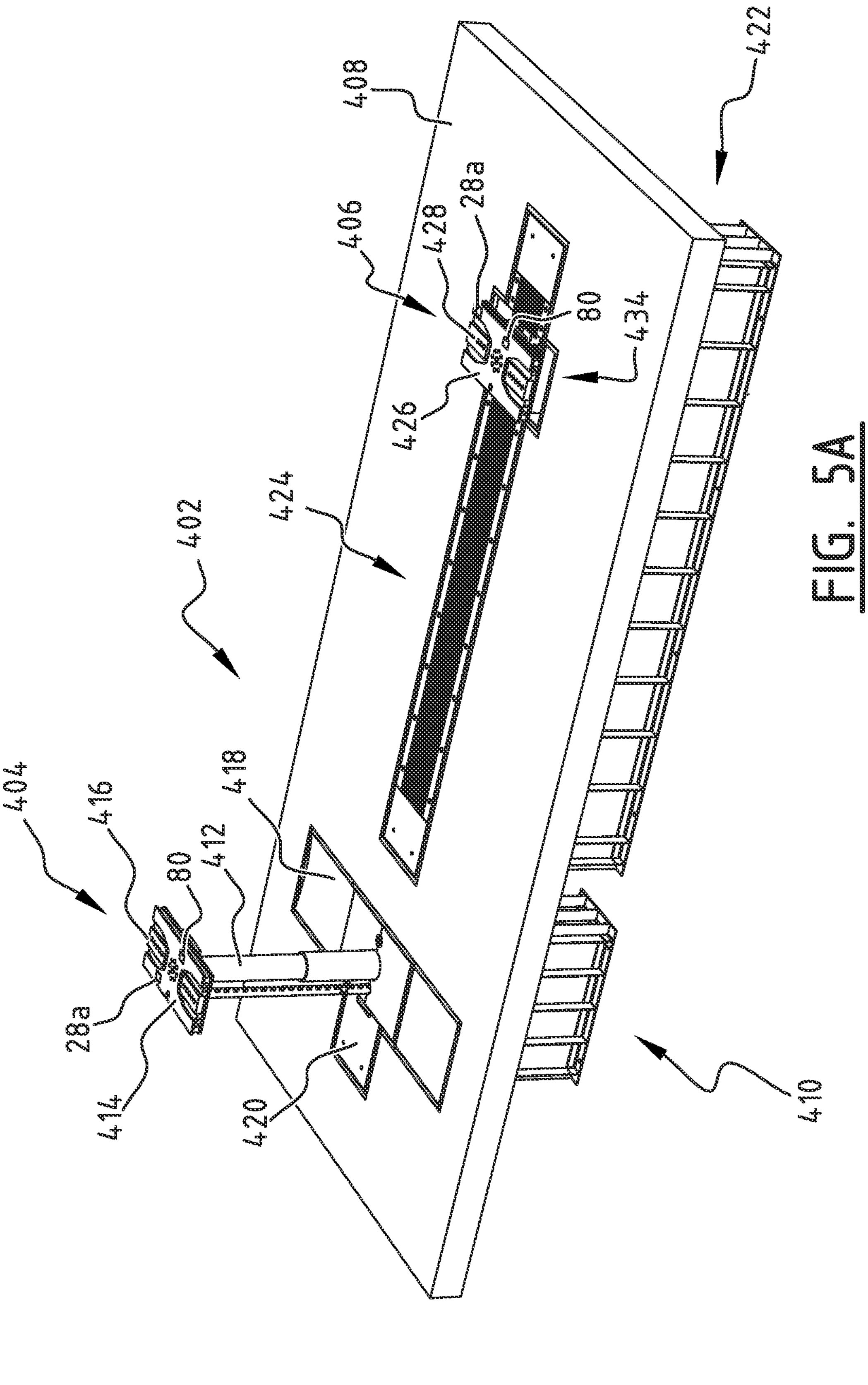
Figure 5B:
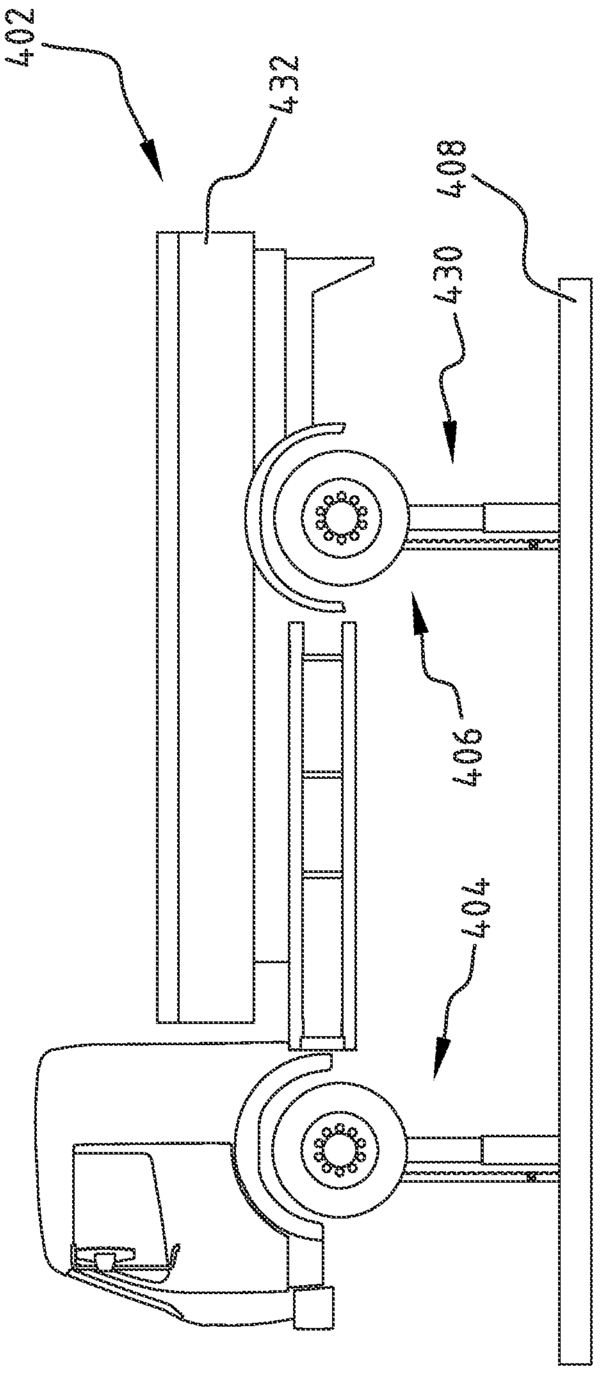

In a further alternative embodiment lifting system 402 (FIG. 5A-B) is of the in-ground lift type comprising stationary lifting column/device 404 and a moveable lifting column/device 406 that are located on or in floor 408. The front lifting column/device 404 is provided in cassette or box 410 with a telescopic lifting cylinder 412. On top of cylinder 412 there is provided carrier 414 with axle carriers 416. In the illustrated embodiment wheel hatches or wheel recesses 418 are provided. Hatches/recesses 418 define the position of the front wheels of the vehicle. Furthermore, in the illustrated embodiment a hatch 420 is provided in front of the front lifting column/device 404 for maintenance, for example.

The moveable lifting column/device 406 moves in cassette or box 422 comprising a telescopic lifting cylinder 430. Box 422 provides a pit with a slot or recess 424 for guiding the moveable lifting column/device 406. Moveable lifting column/device 406 is provided with carrier 426 whereon axle carriers 428 are mounted. Depending on the type of vehicle 432 additional adapters can be provided that cooperate with carriers 414, 426 to enable engagement with different axle dimensions.

Columns/devices 404, 406 are provided with transponders 28*a*. When storing column 406 descent system 78 controls the position of column/device 406 relative to hatches/recesses 434. Optionally, this can be performed automatically by controller 22.

Figure 6:
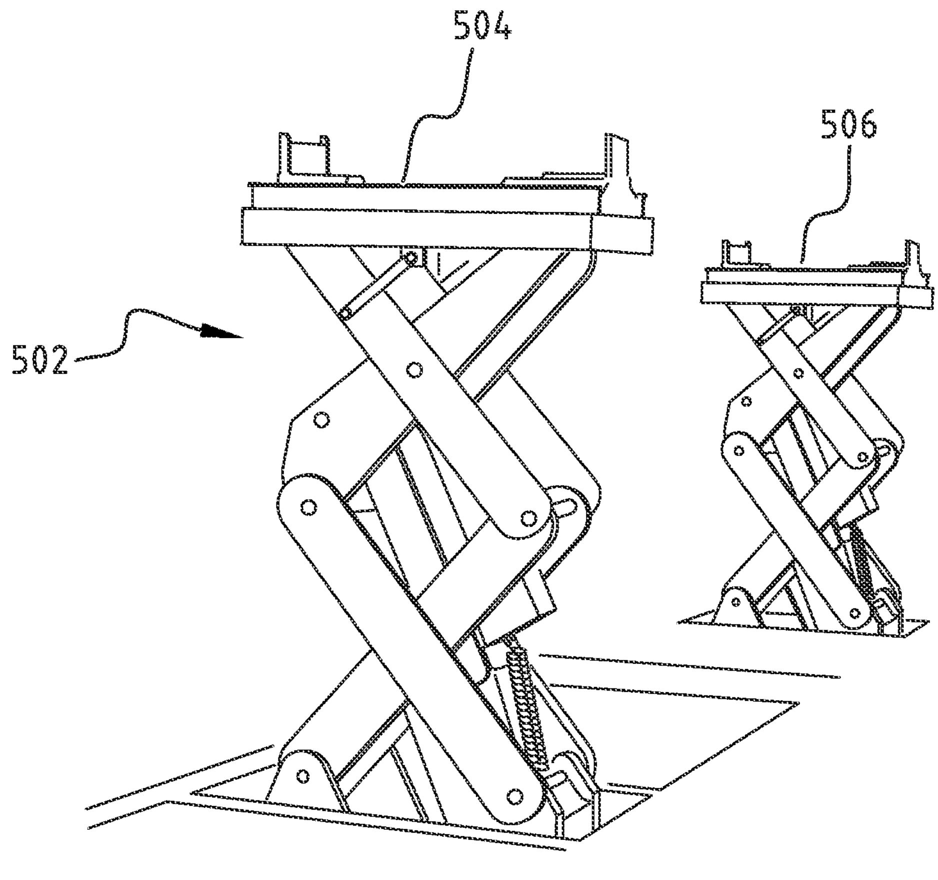

In an alternative lifting system 502 of the in-ground type (FIG. 6) the telescopic lifting cylinders 412, 430 of lifting system 402 are replaced by scissor type lifts 504, 506. It will be understood that operation of lifting systems 402, 502 of the in-ground type is similar.

Figure 7:
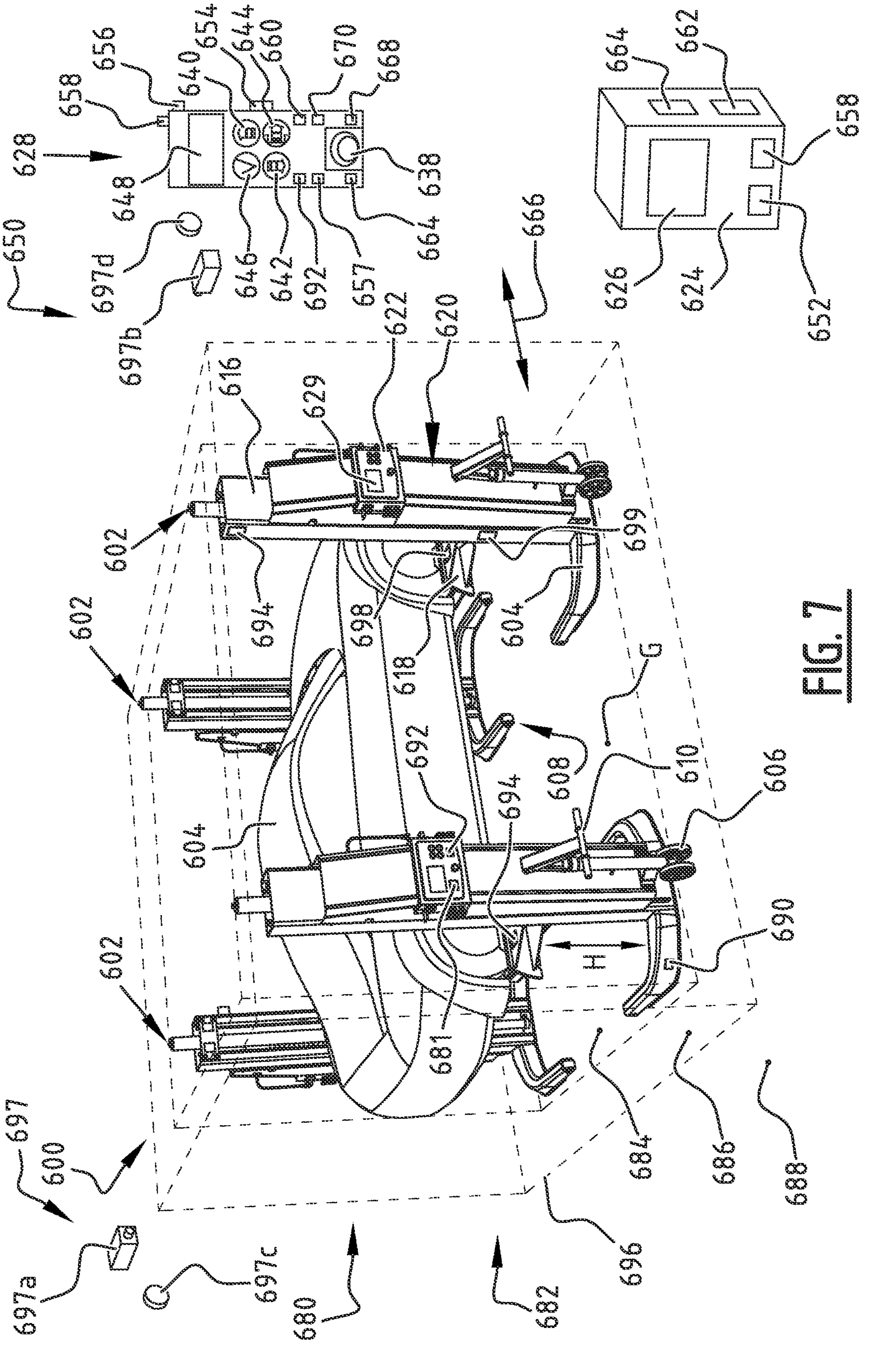

Lifting system 600 comprises a set of four lifting devices 102 (FIG. 7). Lifting columns 602 lift passenger car 604 from ground 606. In the illustrated embodiment lifting columns 602 are connected to each other by wireless communication means. Lifting columns 602 comprise foot 604 which can travel on running wheels 606 over ground surface 6 or for instance a floor of a garage or workshop. In the forks of foot 604 there is provided additional running wheel 608. Running wheel 606 is part of pallet truck mechanism 610 that enables easy maneuvering of mobile lifting column 602. Lifting column 602 further comprises mast 616 and carrier 618 that is movable up downward along mast 616. Carrier 618 is driven by motor/drive system 620.

In the illustrated embodiment each lifting column 602 is provided with the local controller 622 that allows a user to control lifting system 600. In the illustrated embodiment separate controller 624 with optional display 626 is provided.

Also, in the illustrated embodiment lifting system 600 comprises remote control 628. In the illustrated embodiment remote control 628 comprises emergency stop 638, lifting button 640, lowering button 642, unlock button 644, and confirmation bottom 646. In addition, display 648 is provided. It will be understood that other configurations for remote control 628 can also be envisaged in accordance with the present invention.

In the illustrated embodiment remote control 628 comprises RFID tag 657 as part of RFID-system 650. Controller 624 comprises RFID-reader 652 in the illustrated embodiment. It will be understood that other configurations for the RFID-system 650 can also be envisaged in accordance with the present invention.

Remote control 628 further optionally comprises magnetic coupling 654 to enable coupling remote control 16 to lifting device 2. Also optionally, lamp 656 is provided to generate a torch-like functionality to remote control 628 and/or provide a visual warning means as an alternative or in addition to acoustic signaler 658 that is optionally provided in remote control 628 or control 624. In the illustrated embodiment de-activator 660 is schematically illustrated in remote control 628. Charger 662, preferably of the wireless type, is schematically illustrated for lifting system 600.

Transmitter/receiver(s) 664 are provided to remote control 628 and control 624 and provide an embodiment of a wireless communication coupling for lifting system 600. Transmitter/receiver(s) 664 are configured for coupling to another lifting device to enable joint coupling of a vehicle, such as vehicle 604, with one, two, (or) more lifting systems 600 and/or any of the other lifting devices or systems.

The activation distance 666 is schematically illustrated in FIG. 7 for remote control 628 and lifting system 600. De-activator 670 is schematically illustrated in remote control 16. De-activator 670 deactivates remote control 628 when activation distance 666 is larger than a threshold value and/or a time-out period (time period without activity) is larger than a threshold value.

Furthermore, it will be understood that a controller 624 capable of controlling multiple lifting devices 602 can be provided as a separate controller and/or similar control functions can be incorporated in local controller 622 that also can be used to control the other lifting devices 602 in lifting system 600.

Monitoring system 680 is schematically illustrated in FIG. 7. Monitoring system 680 optionally comprises monitoring controller 681 that can alternatively be integrated with any of the other controllers. In this illustrated embodiment safety zone 682 is provided that comprises inner zone 684 directly below vehicle 640, intermediate zone 686 directly around vehicle 604, and outer zone 688. Preferably, in inner zone 684 remote control 628 can be operated with limited functionality, for example with limited speed, only ascent and no descent functionality. In intermediate zone 686 remote control 628 has full operational functionality. In outer zone 688 remote control 628 does not function. This functional restriction in outer zone 688 can be achieved in software taking the location of remote control 628 into account and/or by limiting the transmission power such that control actions cannot be successfully transferred by remote control 628 to lifting system 600 with lifting devices 602. In the illustrated embodiment intermediate zone 686 lies between inner zone 684 and outer zone 688 with a width preferably in the range of 1 to 5 meters, and more preferably about 2 meters.

Optionally, and is schematically illustrated in FIG. 7, lifting system 600 and/or lifting devices 602 comprise orientation detector 690 to detect the actual position and orientation of the system/device. Also optionally, adaptation system 692 is provided in device 602 and/or remote control 628 to adapt the boundaries of one or more of zones 684, 686, 688, optionally making use of the actual height H of vehicle 604. Also optionally, there is provided vehicle detector 694 and/or engagement safety system 696 for monitoring engagement of carrier 610 to vehicle 604 when lifting vehicle 604 and/or descent safety system 698 for monitoring a safe descent of carrier 618 and/or release system 699 for releasing carrier 618 enabling lifting device 602 and system 600 to lift vehicle 604.

Also optionally, safety surround system 697 comprises one or more cameras 697*a,b* and/or 697*c,d*. In the preferred and illustrated embodiment safety surround system 697 comprises two (or more) cameras/mirrors 697*a,b,c,d* that are preferably provided at or adjacent the corners of lifting system 600 to provide an operator with a full view around vehicle 604. Optionally, camera views are shown on display 648 of remote control 628 and or display 649 of lifting device 602.

Figure 8:
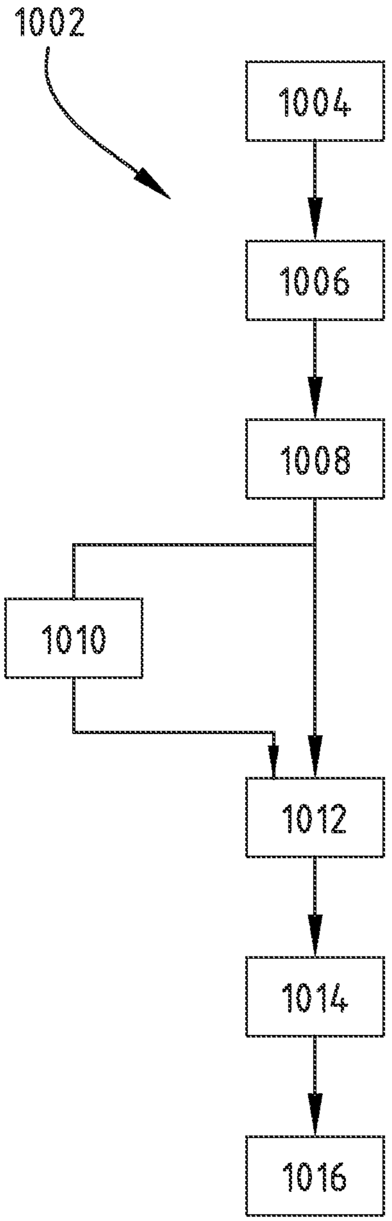
FIG. 8 shows steps of a method of lifting a vehicle according to the present invention.

Method 1002 (FIG. 8) of lifting a vehicle starts in step 1004 with the selection of remote control 16, 128 (FIG. 8) after which authorization step 1006 is performed, wherein optionally a user is identified and/or authorized to perform certain operations with certain lifting devices. Thereafter, the lifting device or lifting devices are optionally selected in selection step 1008 using remote control 128 or any of the local controllers. Optionally, a further lifting device or system is selected in step 1010. For example, this step can be used in different situations, including when lifting trains or road trains, or articulated/accordion buses. The control of the lifting operation is started in step 1012 whereafter the vehicle can be lifted in lifting step 1014. After work on the vehicle is performed or otherwise ended, a deactivation step 1016 is performed to end the operation of lifting vehicle 4.

Figure 9:
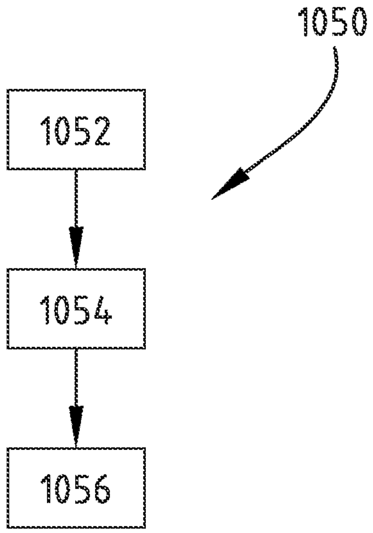
FIG. 9 shows steps for a safety protocol while operating the lift according to the present invention.

Safety protocol 1050 (FIG. 9) involves communication check 1052. Check 1052 involves checking communication is received within a specific time interval. Optionally, distance check 1054 is performed to check distance 666 between remote control 628 and the one or more lifting devices. Also optionally, activity check 1056 is performed, preferably involving starting a time-out time period after an action is performed. In case the timeout period passes and/or exceeds a threshold value without any further activity from a user and/or distance 666 exceeds a threshold value, the remote control 628 is decoupled from the respective lifting device.

It will be understood that the invention can be applied to a range of lifting systems, including but not limited to four-post and two-post lifting columns, such as the Stertil-Koni one post lifts ST1075, the Stertil-Koni two post lifts SK 2070, and the Stertil-Koni four post lifts ST 4120, skylift, mobile columns, and in-ground lifts, such as the Stertil in-ground Ecolift and the Stertil in-ground Diamond lift. Also, it will be understood that additional embodiments of the invention can be envisaged combining and/or switching features from the described and/or illustrated embodiments. For example, instead of light 110, 210, or in addition thereto, sound signals, indications on a control system etc. can be applied.

When vehicle 6, 432, 604 needs to be lifted, lifting system 2, 102, 202, 302, 402, 502, 600 is activated. For example, a user can activate the lifting system with remote control 48. Preferably, a safety zone 60, 74, 682 is provided to increase the overall safety. The size of these zones can be adjusted depending on vehicle type and/or carrier height. Carrier height is determined using indoor positioning system 28 in combination with transponders 28*a*, electronic compass 28*b* and "satellites" 28*c*. In case of mobile lifting columns 4, the selection of specific lifting column 4 to be included in a group 2*a*, 2*b* can be done by central controller 22 using information of the specific location and carrier height of available lifting columns 4, for example. Such selection can be presented to the user as a suggestion that requires authorization by the user or can be selected automatically by controller 22. Release system 22 may lock/unlock carrier 16 as an additional safety measure. In case someone or something enters specific parts of safety zone 60, 74, central controller 22 is informed and may instruct release system 72 to lock carrier 16. Carrier 16 can be unlocked after the person or object is removed from safety zone 60, 74, 682 for example. This can be performed automatically or requires user authorization or user input. Positions of persons and/or objects including tools and accessories can be controlled by providing additional transponders 50 in these tools and/or objects. This further enables monitoring and control of the engagement of carrier 16 to vehicle 6, 432, 604 when involving these tools, such as an axle stand, transmission jack or wheel dolly, for example.

The present invention is by no means limited to the above described preferred embodiments. The rights sought are defined by the following claims within the scope of which many modifications can be envisaged. The present invention is described using a lifting device such as a lifting column and more specifically a mobile lifting column. The invention can also be applied to other type of lifting columns such as so-called boom-lifts, scissor-lifts and loading platforms. Such lifting equipment can be provided with the measures illustrated above according to the invention.

The invention claimed is:

1. A lifting system comprising one or more lifting devices for lifting a vehicle, the system comprising:

a frame with a carrier configured for carrying the vehicle;

a drive for driving the carrier in at least one of the ascent or descent of the carrier; and a controller comprising an indoor positioning system such that the controller determines a location and a height of the carrier in at least one of the ascent or descent of the carrier of the one or more lifting devices, and wherein the controller comprises a remote control, wherein the controller further comprising a monitoring system configured for monitoring a safety zone, wherein the monitoring system monitors a three-dimensional zone, and wherein the safety zone comprises an inner zone, an intermediate zone and an outer zone, the remote control having limited functionality in the inner zone, full functionality in the intermediate zone, and no functionality in the outer zone.

2. The lifting system according to claim 1, wherein the controller further comprising an orientation detector.

3. The lifting system according to claim 2, wherein the orientation detector is a transponder.

4. The lifting system according to claim 1, wherein the controller senses the location of the remote control.

5. The lifting system according to claim 1, wherein the monitoring system comprises an adaptation system configured for adjusting the boundaries of the safety zone.

6. The lifting system according to claim 5, wherein the adaptation system responds to a height measurement of the carrier.

7. The lifting system according to claim 1, further comprising a vehicle detector.

8. The lifting system according to claim 1, wherein the monitoring system further comprises a warning system configured for providing a warning signal and/or control signal in response to a person and/or an object entering and/or being in the safety zone.

9. The lifting system according to claim 7, wherein the monitoring system further comprises a warning system configured for providing a warning signal and/or control signal in response to a person and/or an object entering and/or being in the safety zone.

10. The lifting system according to claim 1, wherein the boundaries of the safety zone are adjustable to define customized shapes.

11. The lifting system according to claim 10, wherein the geometric shapes of a safety zone include at least two from the group of a rectangle, a dome, a circle, a sphere, and a donut.

12. The lifting system according to claim 1, wherein the monitoring system comprises an engagement safety system configured for monitoring engagement of the carrier to the vehicle when lifting the vehicle.

13. The lifting system according to claim 1, wherein the monitoring system comprises a descent safety system configured for monitoring a safe descent of the carrier.

14. The lifting device according to claim 1, the lifting device further comprises a release system for releasing the carrier enabling the lifting system to lift the vehicle.

15. The lifting system according to claim 1, the lifting system comprising two or more sets of lifting devices, wherein each set is configured for lifting a vehicle, and a central controller.

16. The lifting system according to claim 1, further comprising one or more tools and/or accessories that comprise a transponder.

17. A method for lifting a vehicle, the method comprising the steps of providing the lifting system according to claim 1;

determining the location and the height of the carrier of the one or more lifting devices;

monitoring the safety zone with the monitoring system;

lifting the vehicle with the carrier of the one or more lifting devices.

18. The method according to claim 17, further comprising a step of adapting boundaries of the safety zone with an adaptation system in response to a height measurement.

19. A lifting system for lifting a vehicle, the system comprising:

one or more lifting devices, each comprising;

a frame with a carrier configured for carrying the vehicle;

a drive for driving each of the carriers of the one or more lifting devices in at least one of the ascent or descent of each of the carrier; and a controller comprising an indoor positioning system with a transponder, wherein the transponder is provided on or at each of the carrier of the one or more lifting devices such that the controller determines the location and the height of each of the carrier in at least one of the ascent or descent of each of the carrier of the one or more lifting devices, and wherein the controller comprises a remote control, wherein the controller further comprising a monitoring system configured for monitoring a safety zone, wherein the monitoring system monitors a three-dimensional zone, and wherein the safety zone comprises an inner zone and an outer zone, the remote control having limited functionality in the inner zone and no functionality in the outer zone.

20. The lifting system according to claim 19, wherein the controller senses the location of the remote control.

21. The lifting system according to claim 1, further comprising a safety surround system showing camera views on a display of the remote control.

22. The lifting system according to claim 1, wherein the inner zone is defined by an area below the vehicle and the intermediate zone defined by an outer most portion around the vehicle.

* * * * *